2,802,826

OCTAHYDRO-PYRIDO[4,3-D]PYRIMIDINE COMPOUNDS

John Thomas Plati, Rutherford, and Wilhelm Wenner, Upper Montclair, N. J., assignors to Hoffmann-La Roche Inc., Nutley, N. J., a corporation of New Jersey No Drawing. Application July 13, 1955, Serial No. 521,914

8 Claims. (Cl. 260—256.4)

This invention relates to 1,3,6-trimethyl-8,8-diphenyl-1,2,3,4,5,6,7,8-octahydro - pyrido[4,3 - d]pyrimidines and salts thereof. More particularly, the invention relates to 1,3,6-trimethyl-8,8-diphenyl - 1,2,3,4,5,6,7,8 - octahydro-pyrido[4,3-d]pyrimidine, analogous compounds wherein one or both of the diphenyl groups in the 8-position bears an additional substituent attached to the nuclear carbon atom, and salts of said compound. The bases of this invention may be represented by the following structural formula

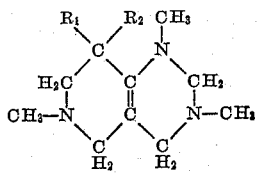

wherein $R_1$ and $R_2$ each represents a nuclearly substituted or unsubstituted monocyclic 6-membered aryl group.

The bases of this invention are referred to hereinafter by the term 1,3,6-trimethyl-8,8-diphenyl-1,2,3,4,5,6,7,8-octahydro-pyrido[4,3-d]pyrimidines. This term as used in the specification and claims is intended to refer to 1,3,6-trimethyl-8,8-diphenyl - 1,2,3,4,5,6,7,8 - octahydro-pyrido[4,3-d]pyrimidine and to the corresponding bases in which one or both of the phenyl groups in the 8-position are substituted phenyl groups, that is to say, the 8-position is substituted by nuclearly substituted or unsubstituted monocyclic 6-membered aryl groups, e. g., 1,3,6 - trimethyl-8,8 - bis(p-chlorophenyl)1,2,3,4,5,6,7,8-octahydro - pyrido[4,3-d]pyrimidine, 1,3,6-trimethyl-8-phenyl-8-p-chlorophenyl -1,2,3,4,5,6,7,8-octahydro-pyrido-[4,3-d]pyrimidine, etc. Substituents which may be attached to one or both of the phenyl groups in the 8-position include the halogens, lower alkyl groups and lower alkoxy groups. A preferred group of bases of this invention includes 1,3,6-trimethyl-8,8-diphenyl-1,2,3,4,5,6,7,8-octahydro-pyrido[4,3-d]pyrimidines in which one or both of the phenyl groups in the 8-position bears a chloro, fluoro, methyl or methoxy group, preferably in the para-position, and the base unsubstituted on either 8-phenyl group.

The bases of this invention form acid addition salts with inorganic acids such as the mineral acids, hydrochloric, hydrobromic, hydriodic, sulfuric, phosphoric acids, etc., and with organic acids such as oxalic, citric, tartaric acids and the like. These acid addition salts may be formed by reacting the base with the appropriate acid, preferably in a solvent, such as methanol, ether, etc., or combinations thereof. A preferred class of salts constitutes non-toxic, pharmaceutically acceptable acid addition salts conventionally employed in therapeutic applications. Acid addition salts containing one or more acid groups in the molecule are encompassed within the scope of this invention.

The 1,3,6-trimethyl-8,8-diphenyl-1,2,3,4,5,6,7,8-octahydro-pyrido[4,3-d]pyrimidines of this invention are synthesized by reacting a diphenyl propanone such as diphenyl acetone or a diphenyl propanone bearing a substituent on one or both of the phenyl groups, such as 1-phenyl-1-para-chlorophenyl-2-propanone, with methylamine and formaldehyde under basic conditions, e. g. in the presence of an organic base. The reaction is preferably carried out in an alcoholic solvent such as methanol.

The diphenyl propanones which are intermediates in the preparation of the compounds of this invention are synthesized by dehydrating the corresponding glycol in the presence of acids such as sulfuric acid or toluenesulfonic acid.

The compounds of this invention are useful in the treatment of collagen diseases; more particularly they have utility as antiarthritic agents. They may be administered in the conventional manner in therapeutic doses by oral administration, e. g. in tablet form.

The following examples are illustrative of the compounds of this invention. Certain of the compounds may contain water or methanol of crystallization. All temperatures are in degrees centigrade.

Example 1

528 cc. of formaldehyde (37.8% aqueous solution by weight) were added to a solution of 583 g. of methylamine (25% aqueous solution by weight) in 3060 cc. of methyl alcohol. The temperature rose to 54°. The solution was cooled to 30° and 327 g. of diphenylacetone were then added. The mixture was refluxed for 16 hours. The mixture was concentrated in vacuo until almost all of the solvent was removed. 1300 cc. of water were then added to the residue with cooling and stirring. The temperature was maintained below 20° in an ice bath while the solution was made distinctly acid by the addition of 458 cc. of concentrated hydrochloric acid. The solution was extracted with 1300 cc. of ether to remove the neutral substances. The aqueous layer was cooled below 20° in an ice bath and made alkaline with 300 cc. of sodium hydroxide (50% aqueous solution by weight). The alkaline solution was extracted once with 1300 cc. of ether and a second time with 500 cc. of ether. 130 g. of oxalic acid in ether were added to the combined ether extracts. The mixture was stirred, then allowed to stand until a gummy material coagulated. The gum was separated by decantation and crystallized from 10.5 liters of ethanol. The 1,3,6-trimethyl-8,8-diphenyl-1,2,3,4,5,6,7,8-octahydro-pyrido[4,3-d]pyrimidine dioxalate melted at 171–174° with effervescence.

Calculated for $C_{22}H_{27}N_3 \cdot 2C_2H_2O_4$: C, 60.81; H, 6.09; N, 8.18. Found: C, 60.13; H, 5.22; N, 7.66.

Example 2

The dioxalate obtained in Example 1 was dissolved in 3 liters of water at 35° and the solution was made basic by addition of an excess (97 cc.) of 50% sodium hydroxide. The gummy precipitate which formed gradually hardened on standing. The gummy precipitate, 1,3,6-trimethyl-8,8-diphenyl-1,2,3,4,5,6,7,8-octahydro - pyrido [4,3-d]pyrimidine, was separated by filtration. The product, B. P. 190–192°/0.5 mm., is soluble in chloroform, methanol and ethanol.

A mineral oil mull of 1,3,6-trimethyl-8,8-diphenyl-1,2,3,4,5,6,7,8-octahydro-pyrido[4,3-d]pyrimidine shows absorption bands at the following wavelengths in the infrared spectrum (in microns): 3.63, 6.07, 6.25, 6.70, 6.87, 6.95, 7.03, 7.20, 7.25, 7.57, 7.75, 7.90, 8.08, 8.18, 8.28, 8.38, 8.46, 8.57, 8.74, 8.85, 8.97, 9.08, 9.24, 9.36, 9.44, 9.72, 9.85, 9.96, 10.33, 10.55, 10.75, 10.95, 11.17, 11.60, 13.13, 13.38, 14.07, 14.30, 14.76, and 14.98.

Calculated for $C_{22}H_{27}N_3$: C, 79.24; H, 8.16; N, 12.60. Found: C, 79.37; H, 7.92; N, 13.05.

Example 3

18 g. of a hot solution of d-tartaric acid in 6 cc. of methanol were added to 40 g. of 1,3,6-trimethyl-8,8-diphenyl - 1,2,3,4,5,6,7,8-octahydro-pyrido[4,3-d]pyrimidine dissolved in 132 cc. of methanol. The mixture was permitted to stand overnight. The crystalline d-tartrate of 1,3,6-trimethyl-8,8-diphenyl-1,2,3,4,5,6,7,8-octahydro-pyrido[4,3-d]pyrimidine was separated by filtration and dried on a steam bath. The product melted at 178–181°. The d-tartrate obtained in this manner is soluble in water and slightly soluble in 95% ethanol. Neutralization equivalent (perchloric acid in acetic acid): calculated, 242; found, 241.

Calculated for $C_{22}H_{27}N_3 \cdot C_4H_6O_6$: C, 64.58; H, 6.88. Found: C, 64.74; H, 6.94.

Example 4

200 cc. of hydrochloric acid dissolved in ethanol were added to a solution of 94 g. of the base obtained in Example 2 in 500 cc. of warm ethanol at a temperature below 40° to a pH of about 1.0. 1400 cc. of ether were added and 1,3,6-trimethyl-8,8-diphenyl-1,2,3,4,5,6,7,8-octahydro-pyrido[4,3-d]pyrimidine dihydrochloride precipitated. Recrystallized from isopropanol, the dihydrochloride melted at 186–187° with decomposition. The dihydrochloride thus obtained is solubled in water and ethanol.

Calculated for $C_{22}H_{27}N_3 \cdot 2HCl$: Cl, 17.45. Found: Cl, 16.86.

Example 5

81 grams (0.654 mol) of 25% aqueous methylamine and 74.3 g. (0.92 mol) of 37.2% aqueous formaldehyde were dissolved in 420 cc. of methanol while cooling. 63 g. (0.215 mol) of 1,1-bis(p-chlorophenyl)2-propanone were added. The ketone dissolved completely on heating the mixture to reflux. The solution was refluxed for 16 hours. Then the solvent and excess methylamine and formaldehyde were distilled off in vacuo on a water bath at 60°.

180 cc. of water were added to the syrupy residue while cooling below 20°. The mixture was acidified with 60 cc. of concentrated hydrochloric acid. Unchanged ketone was extracted with ether. The aqueous-acid phase was made basic by the addition of 40 cc. of 50% sodium hydroxide solution while cooling below 20°. The free base, 1,3,6-trimethyl-8,8-bis(p-chlorophenyl)1,2,3,4,5,6-7,8-octahydro-pyrido[4,3-d]pyrimidine, was taken up in ether and the ether was then distilled off in vacuo using a water bath at 60° to insure the removal of any residual methylamine. The free base was crystallized from methanol as a solid, M. P. 70–80°.

Calculated for $C_{22}H_{25}Cl_2N_3 \cdot CH_4O$: C, 63.59; H, 6.73; N, 9.67. Found: C, 63.96; H, 6.36; N, 9.91.

Example 6

The free base obtained in Example 5 was dissolved in ether and a saturated solution of oxalic acid in ether was added. 1,3,6-trimethyl-8,8-bis(p-chlorophenyl)1,2,3-4,5,6,7,8-octahydropyrido[4,3-d]pyrimidine dioxalate precipitated. The precipitate was filtered, washed with ether and recrystallized from 2400 cc. of methanol, M. P. 179–181°.

Calculated for $C_{22}H_{25}Cl_2N_3 \cdot 2(COOH)_2$: C, 53.72; H, 5.01; N, 7.38. Found: C, 53.77; H, 4.95; N, 7.58.

Example 7

63.1 grams (0.795 mol) of 37.2% aqueous formaldehyde and 69.5 g. (0.563 mol) of 25% methylamine in water were dissolved in 375 cc. of methanol. The solution, which warmed spontaneously, was cooled to room temperature. 50 g. (0.185 mol) of 1,1-bis(p-methoxyphenyl)2-propanone were added and dissolved by heating. The solution was refluxed for 16 hours.

The solvent was distilled off in vacuo and to the residual oil were added 150 cc. of water. The mixture was acidified by the addition of 65 cc. of concentrated hydrochloric acid while cooling below 20°. The unchanged ketone was extracted with ether. The aqueous-acid phase was made basic by the addition of 70 cc. of 50% sodium hydroxide. The free base, 1,3,6-trimethyl-8,8-bis(p-methoxyphenyl)1,2,3,4,5,6,7,8 - octahydro - pyrido-[4,3-d]pyrimidine, was extracted with ether, then the ether was removed in vacuo to leave the free base as a syrupy residue.

Example 8

The free base obtained in Example 7 was dissolved in 250 cc. of ether and treated with an excess of a saturated solution of oxalic acid in ether. 1,3,6-trimethyl-8,8 - bis(p-methoxyphenyl)1,2,3,4,5,6,7,8 - octahydro-pyrido[4,3-d]pyrimidine dioxalate precipitated as a gummy mass. The dioxalate was then crystallized from 400 cc. of methanol and 30 cc. of water, M. P. 162–164° with decomposition.

Calculated for $C_{24}H_{31}N_3O_2 \cdot 2(COOH)_2 \cdot CH_4O$: C, 57.51; H, 6.49; N, 6.94. Found: C, 57.54; H, 6.44; N, 6.82.

Example 9

The dioxalate obtained in Example 8 was dissolved in water and the free base was precipitated as an oil with excess 10% sodium hydroxide. The free base was extracted with ether and converted to the dihydrochloride by the addition of ethanolic HCl. The dihydrochloride separated as an oil but crystallized on scratching. The 1,3,6 - trimethyl-8,8-bis(p-methoxyphenyl)1,2,3,4,5,6,7,8-octahydro-pyrido[4,3-d]pyrimidine dihydrochloride was crystallized from methanol and ether, M. P. 197–198° with decomposition.

Calculated for $C_{24}H_{31}N_3O_2 \cdot 2HCl \cdot H_2O$: C, 59.51; H, 7.28; N, 8.67. Found: C, 58.64; H, 7.08; N, 8.61.

Example 10

14.3 g. of magnesium turnings (0.586 mol) were placed in a 1-liter, 3-necked flask with 150 cc. of dry ether. 30 cc. of a solution of 112 g. (0.586 mol) of p-bromochlorobenzene in enough ether to make a volume of 270 cc. were dropped in. After the reaction began, the remainder of the p-bromochlorobenzene was added over a 40 minute period. The mixture was refluxed for 1½ hours, then cooled. A solution of 44 g. (0.293 mol) of benzoyl methyl carbinol diluted to 180 cc. with ether, was added over a one hour period. The mixture was refluxed for 1½ hours and then allowed to stand 62 hours at room temperature. The mixture was decomposed by treatment with 150 cc. of 40% acetic acid. The ether layer was separated, washed with water, dried and the ether boiled off on the steam bath. The residual ether was removed in vacuo, leaving 1-phenyl-1-p-chlorophenyl-2-methylglycol as a brown, syrupy residue. Upon distillation, the boiling point is 190°/2.0 mm.

40 g. of the glycol obtained above were dehydrated by treatment with 430 cc. of concentrated sulfuric acid at 0° for 1 hour and at room temperature for 2 additional hours. The reaction mixture was poured over 1600 g. of cracked ice and then extracted with ether. The ether solution was dried, the ether boiled off and the residue distilled in vacuo to obtain 1-phenyl-1-p-chlorophenyl-2-propanone, B. P. 167–168°/2.5 mm.

21.8 g. (0.270 mol) of 37.2% aqueous formaldehyde, 23.6 g. (0.190 mol) of 25% methylamine and 130 cc. of methanol were mixed while cooling to room temperature. 15.4 g. (0.0628 mol) of 1-phenyl-1-p-chlorophenyl-2-propanone were added and dissolved by heating. The solution was refluxed 16 hours.

The solvent was distilled off in vacuo and the residue was treated with 50 cc. of water, cooled below 20°, and acidified with 25 cc. of concentrated hydrochloric acid. Unchanged ketone was extracted with ether. The free base, 1,3,6-trimethyl-8-phenyl-8-p-chlorophenyl-1,2,3,4,5, 6,7,8-octahydro-pyrido[4,3-d]pyrimidine was precipitated from the aqueous phase by the addition of 20 cc. of 50% sodium hydroxide while cooling below 20°. The free base was taken up in ether and the ether was then distilled off in vacuo.

Example 11

The syrupy base obtained in Example 10 was dissolved in ether and treated with a saturated solution of oxalic acid in ether. The 1,3,6-trimethyl-8-phenyl-8-p-chlorophenyl-1,2,3,4,5,6,7,8-octahydro-pyrido[4,3-d]pyrimidine dioxalate was recrystallized from 200 cc. of hot methanol, M. P. 172–173°.

Example 12

5.6 g. of the dioxalate obtained in Example 11 were dissolved in water. The free base was precipitated by the addition of excess 10% sodium hydroxide and extracted with ether. The ether solution was treated with ethanolic HCl. 1,3,6-trimethyl-8-phenyl-8-p-chlorophenyl-1,2,3,4,5,6,7,8-octahydro-pyrido[4,3-d]pyrimidine dihydrochloride precipitated as an oil which crystallized on scratching. The dihydrochloride was recrystallized from ether-methanol, M. P. 194–196° with decomposition.

Calculated for $C_{22}H_{26}N_3Cl.2HCl.H_2O$: C, 57.58; H, 6.59; N, 9.16. Found: C, 57.30; H, 6.42; N, 8.80.

Example 13

43 g. (0.534 mol) of 37.2% aqueous formaldehyde and 46.3 g. (0.374 mol) of 25% methylamine were dissolved in 260 cc. of methanol while cooling, then 29.8 g. (0.124 mol) of 1-phenyl-1-p-methoxyphenyl-2-propanone were added. The solution was refluxed for 16 hours.

The solvent was distilled off in vacuo at 60° and the residue was then treated with 100 cc. of water. The mixture was acidified with concentrated hydrochloric acid while cooling below 20°. Unchanged ketone was removed by extraction with ether.

The free base, 1,3,6-trimethyl-8-phenyl-8-p-methoxyphenyl-1,2,3,4,5,6,7,8-octahydro-pyrido[4,3-d]pyrimidine, was precipitated from the aqueous phase by the addition of an excess of 50% sodium hydroxide solution while cooling below 20°. The oily base was extracted with ether and the ether was then distilled off in vacuo.

Example 14

The oily base obtained in Example 13 was dissolved in ether and 1,3,6-trimethyl-8-phenyl-8-p-methoxyphenyl-1,2,3,4,5,6,7,8-octahydro-pyrido[4,3-d]pyrimidine dioxalate was precipitated as a gum by treatment of the ether solution with a saturated solution of oxalic acid in ether. The ether was decanted off and the gummy dioxalate was crystallized from 50 cc. of methanol, the hot solution being cleared by filtration. The product, which crystallized in fine needles, was filtered and dried in the vacuum desiccator. On further drying in the oven at 75°, the product melted at 158–160° with decomposition.

Example 15

The dioxalate obtained in Example 14 was dissolved in 75 cc. of water and the free base was precipitated as a gum by addition of excess 10% sodium hydroxide. The base was taken up in ether. Ethanolic HCl was added to the ether solution of the base. 1,3,6-trimethyl-8-phenyl-8-p-methoxyphenyl-1,2,3,4,5,6,7,8-octahydropyrido[4,3-d]pyrimidine dihydrochloride precipitated as an oil which then crystallized on scratching. The dihydrochloride was recrystallized from 16 cc. of methanol and 55 cc. of ether, M. P. 173–175° with decomposition.

Calculated for $C_{23}H_{29}N_3O.2HCl.H_2O$: C, 60.77; H, 7.32; N, 9.25. Found: C, 60.54; H, 7.30; N, 8.86.

Example 16

75 g. (0.315 mol) of 1,1-di(p-tolyl)2-propanone were refluxed 16 hours with 109 g. (1.35 mols) of 37.4% aqueous formaldehyde, 118 g. (0.948 mol) of 25% methylamine in water and 720 cc. of methanol. The solvent was distilled off in vacuo at 60°. The residue was treated with 400 cc. of water and then acidified with 80 cc. of concentrated hydrochloric acid while cooling below 20°. Unchanged ketone was extracted with 400 cc. of ether. The aqueous phase was made basic by the addition of 70 cc. of 50% sodium hydroxide while cooling below 20°. The free base, 1,3,6-trimethyl-8,8-bis(p-tolyl)1,2,3,4,5,6,7,8 - octahydro-pyrido[4,3-d]pyrimidine, was taken up in ether and after drying for a short time over sodium sulfate, the ether was distilled off in vacuo on a water bath at 60°.

Example 17

The free base obtained in Example 16 was dissolved in ether. An excess of a saturated solution of oxalic acid in ether was added. 1,3,6-trimethyl-8,8-bis(p-tolyl)-1,2,3,4,5,6,7,8-octahydropyrido[4,3 - d]pyrimidine dioxalate precipitated in crystalline form. The dioxalate was dried over steam, recrystallized from 350 cc. of methanol and dried again over steam, M. P. 164–166°.

Calculated for $C_{24}H_{31}N_3.2(COOH)_2.H_2O$: C, 60.24; H, 6.67; N, 7.51. Found C, 60.14; H, 6.67; N, 7.38.

Example 18

10 g. of the dioxalate obtained in Example 17 were dissolved in 200 cc. of water and the free base was precipitated as a gum by the addition of excess 10% sodium hydroxide. The free base was taken up in ether and the solution was treated with a slight excess of ethanolic HCl. 1,3,6-trimethyl-8,8-bis(p-tolyl)1,2,3,4,-5,6,7,8-octahydro-pyridol[4,3-d]pyrimidine dihydrochloride was produced first as an oil which crystallized on scratching. The product was filtered, washed with ether and recrystallized from methanol-ether, M. P. 204–205° with decomposition.

Example 19

17.5 g. (0.72 mol) of magnesium turnings and 150 cc. of dry ether were placed in a 1000 cc. flask equipped with a stirrer, condenser and dropping funnel. 20 cc. of a solution of 126 g. (0.72 mol) of p-fluorobromobenzene in 250 cc. of ether were added and the mixture was refluxed on a water bath. After the reaction began and refluxing became spontaneous, the remainder of the p-fluorobromobenzene was added over a 50 minute period. The reaction mixture was refluxed for 2 additional hours on the water bath and was then cooled to room temperature.

54 g. (0.36 mol) of methyl benzoyl carbinol were then added over a 50 minute period with vigorous stirring. The mixture was refluxed for 2 hours and then allowed to stand overnight. 190 cc. of 40% acetic acid were added. The ether solution was separated, washed three times with 200 cc. portions of water, dried and filtered. The ether was boiled off on a steam bath. The residue was distilled in vacuo to obtain 1-phenyl-1-p-fluorophenyl-2-methyl glycol as a very viscous material boiling at about 170°/1.5 mm.

40 g. of 1-phenyl-1-p-fluorophenyl-2-methyl glycol were heated to 70° and treated with 0.40 g. of p-toluenesulfonic acid. The mixture was heated for 45 minutes at 85–90° whereupon the mixture became tubid. The mixture was distilled in vacuo to obtain 1-phenyl-1-p-fluoro-2-propanone, B. P. 142–144°/1.0 mm.

59.7 g. (0.496 mol) of 25% aqueous methylamine and 57.0 g. (0.709 mol) of 37.4% aqueous formaldehyde were dissolved in 375 cc. of methanol. The solution, which had warmed spontaneously, was cooled to room temperature. 37.5 g. (0.165 mol) of 1-phenyl-1-p-fluorophenyl-2-propanone were added to the solution which was heated to completely dissolve the ketone. The solution was refluxed overnight and the solvent was then distilled off in vacuo. The residue was treated with 135 cc. of water, cooled below 20° and then acidified with about 60 cc. of concentrated hydrochloric acid. Unchanged ketone was extracted with 250 cc. of ether. The aqueous phase was made basic with about 55 cc. of 50% sodium hydroxide, while cooling below 20°. The free base, 1,3,6-trimethyl-8-phenyl-8-(p-fluorophenyl)1,2,3,4,5,6,7,8,-octahydropyrido[4,3-d]pyrimidine, was extracted with ether and the ether solution was dried and filtered. The ether was distilled off in vacuo leaving the crude base as the residue.

The crude base was purified by first converting the compound into its dioxalate, as described in the following example, and then neutralizing the dioxalate by the addition of an excess of 10% sodium hydroxide followed by crystallization from methanol. The free base melted at 110–112°.

Calculated for $C_{22}H_{26}N_3F$: C, 75.18; H, 7.46. Found: C, 75.27; H, 7.26.

*Example 20*

The crude base obtained as described in Example 19 was dissolved in 120 cc. of ether and treated with an excess of a saturated solution of oxalic acid in ether. 1,3,6-trimethyl-8-phenyl - 8(p-fluorophenyl)1,2,3,4,5,6,7,8-octahydro-pyrido[4,3-d]pyrimidine dioxalate precipitated a a gum. The gummy dioxalate was crystallized from a mixture of 300 cc. of methanol and 10 cc. of water to obtain white crystals, M. P. 179–180° with decomposition.

*Example 21*

0.65 g. of the free base obtained as described in Example 19 were dissolved in 1.4 cc. of hot methanol. To the methanol solution was added 0.28 g. of d-tartaric acid dissolved in 0.8 cc. of hot methanol. The solution was cooled and 1,3,6-trimethyl-8-phenyl-8(p-fluorophenyl)1,2,3,4,5,6,7,8 - octahydro-pyrido[4,3 - d]pyrimidine tartarate crystallized out, M. P. 177–179°.

This application is a continuation-in-part of our copending application Serial Number 459,528, filed September 30, 1954, and now abandoned.

We claim:

1. A compound selected from the group consisting of bases represented by the formula

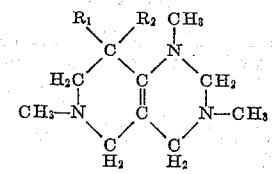

wherein $R_1$ and $R_2$ each represents a member of the group consisting of phenyl, halophenyl, lower alkylphenyl and lower alkoxyphenyl and pharmaceutically acceptable acid addition salts of said bases.

2. 1,3,6-trimethyl-8,8-bis - (p-chlorophenyl) - 1,2,3,4,5,6,7,8-octahydro-pyrido-[4,3-d]pyrimidine.

3. 1,3,6 - trimethyl - 8-phenyl-8-p-methoxyphenyl-1,2,3,4,5,6,7,8-octahydro-pyrido[4,3-d]pyrimidine.

4. 1,3,6 - trimethyl - 8,8-bis(p-tolyl) - 1,2,3,4,5,6,7,8-octahydro-pyrido[4,3-d]pyrimidine.

5. 1,3,6 - trimethyl - 8,8-diphenyl-1,2,3,4,5,6,7,8-octahydro-pydido[4,3-d]pyrimidine.

6. 1,3,6 - trimethyl - 8,8-diphenyl-1,2,3,4,5,6,7,8-octahydro-pyrido[4,3-d]pyrimidine tartrate.

7. A method for producing 1,3,6-trimethyl-8,8-diphenyl-1,2,3,4,5,6,7,8 - octahydro - pyrido[4,3-d]pyrimidines which comprises reacting a diphenyl propononone with methylamine and formaldehyde in the presence of an organic base.

8. A method for producing 1,3,6-trimethyl-8,8-diphenyl - 1,2,3,4,5,6,7,8 - octahydro-pyrido[4,3-d]pyrimidine which comprises reacting diphenylacetone, methylamine and formaldehyde in the presence of an organic base.

No references cited.